United States Patent
Vachon et al.

(10) Patent No.: US 8,342,210 B2
(45) Date of Patent: Jan. 1, 2013

(54) SECURITY CAP WITH LATCH

(76) Inventors: Léandre Vachon, Thetford Mines (CA); Jamil Assaly, Saint-Augustin-de-Desmaures (CA)

( * ) Notice: Subject to any disclaimer, the term of this patent is extended or adjusted under 35 U.S.C. 154(b) by 118 days.

(21) Appl. No.: 12/922,876

(22) PCT Filed: Mar. 18, 2009

(86) PCT No.: PCT/CA2009/000359
§ 371 (c)(1),
(2), (4) Date: Sep. 16, 2010

(87) PCT Pub. No.: WO2009/114948
PCT Pub. Date: Sep. 24, 2009

(65) Prior Publication Data
US 2011/0011480 A1    Jan. 20, 2011

(30) Foreign Application Priority Data

Mar. 18, 2008 (CA) ................................. 2626164

(51) Int. Cl.
F16L 55/10 (2006.01)
(52) U.S. Cl. ....... 138/89; 138/96 R; 220/325; 220/256.1
(58) Field of Classification Search ............. 138/89, 138/96 R, 96 T; 220/325, 259.1, 256.1
See application file for complete search history.

(56) References Cited

U.S. PATENT DOCUMENTS 3,051,200 A    8/1962    Bevington
(Continued)

FOREIGN PATENT DOCUMENTS

CA    2491097    6/2006
(Continued)

OTHER PUBLICATIONS

"PCT International Search Report from International Application No. PCT/CA2009/000359, corresponding to Canadian Patent Application No. 2,626,164, mailed Jul. 2, 2009, pp. 1-4".

Primary Examiner — Patrick F Brinson
(74) Attorney, Agent, or Firm — IPAXIO S.E.N.C.

(57) ABSTRACT

A security cap (1) for selectively closing an open end (3) of a pipe (5). The security cap (1) includes inner and outer cap assemblies (7, 11), at least one latch (17), and a driving assembly (21). The outer cap assembly (11) is rotatable with respect to the inner cap assembly (7), and along with it, is intended to cover the open end (3) of the pipe (5). Each latch (17) is cooperable with the inner and outer cap assemblies (7, 11), and displacable with respect to the cap assemblies (7,11) so as to be operated between first and second configurations, wherein in the first configuration, each latch (17) is drawn away from an outer groove (19) of the open end (3) of the pipe (5) thereby enabling the security cap (1) to be removed from the open end (3) of the pipe (5), and wherein in the second configuration, each latch (17) is engaged with the outer groove (19) thereby preventing the security cap (1) from being removed from the open end (3) of the pipe (5). The driving assembly (21) is operatively disposed between the inner and outer cap assemblies (7, 11), and cooperable with the same, as well as with the at least one latch (17), for selectively driving each latch (17) between the first and second configurations via a given rotation of the outer cap assembly (11) with respect to the inner cap assembly (7) of the security cap (1).

25 Claims, 6 Drawing Sheets

U.S. PATENT DOCUMENTS

| | | |
|---|---|---|
| 3,672,403 A | 6/1972 | Wilson et al. |
| 3,722,549 A | 3/1973 | Wilson et al. |
| 4,351,446 A | 9/1982 | Madden |
| 5,269,433 A | 12/1993 | Piquerez |
| 5,437,309 A | 8/1995 | Timmons |
| 5,640,999 A * | 6/1997 | Wood .............................. 138/89 |
| 6,003,558 A | 12/1999 | Neto et al. |
| 6,029,709 A | 2/2000 | Burgess |
| 6,745,914 B2 * | 6/2004 | Hagano et al. ................ 220/288 |
| 7,134,454 B2 | 11/2006 | Montminy |
| 2006/0138144 A1 * | 6/2006 | Montminy .................... 220/325 |

FOREIGN PATENT DOCUMENTS

| | | |
|---|---|---|
| GB | 1200947 | 8/1970 |

* cited by examiner

SECURITY CAP WITH LATCH

This application is a national stage application under 35 U.S.C. 371 of International Patent Application Ser. No. PCT/CA2009/000359, entitled "SECURITY CAP WITH LATCH", filed Mar. 18, 2009, which claims priority from Canadian Patent Application Serial No. 2,626,164, filed Mar. 18, 2008, which applications are incorporated herein by reference in their entirety.

FIELD OF THE INVENTION

The present invention relates to a security cap. More particularly, the present invention relates to a security cap such as the ones used for selectively opening and closing an open end of a pipe, typically found in the oil and gas industry. The present invention also relates to a kit with components for assembling the security cap, and also relates to a container having a pipe provided with the security cap.

BACKGROUND OF THE INVENTION

In many industries, such as the oil and gas industry, or other related industries, such as the fuel distribution industry, there is a need to block an opening, such as an opening in a pipe of a fuel tank, to prevent unauthorized access to the fuel tank. Currently, such storage tanks include a filling pipe to which a filling tube is attachable for refuelling the tank. When the tank is not refilled, there is a need to protect the opening of the pipe so that unauthorized people cannot access this opening (in order to steal the gas, contaminate the same, etc.).

In currently existing caps for such pipe openings, the cap is typically fixed to the pipe and a lock is secured to the cap so as to prevent an unauthorized person from removing the cap from the pipe. However, the locks that are typically used are relatively easy to break. In addition, such locks are exposed to water infiltration and therefore are prone to rust. Also, when an authorized person needs to access the pipe, there is a need to locate the key corresponding to the given lock. If the key is not readily available, there is a loss of time looking for the key and/or in trying to break the lock. In this latter case, a replacement lock has to be provided, which is undesirable because it represents additional costs and additional waste of time.

Although the above example relates to the fuel distribution industry, there are also many other industries where there is the need to block an opening in a pipe so that access by unauthorized people is prevented.

Known to the Applicant are the following US patents which describe various security caps and the like for closing and open end of a pipe: U.S. Pat. No. 3,722,549 (WILSON et al., 1973); U.S. Pat. No. 4,351,446 (MADDEN, 1982); U.S. Pat. No. 5,437,309 (TIMMONS, 1995); U.S. Pat. No. 6,003,558 (NETO et al., 1999); U.S. Pat. No. 6,029,709 (BURGESS, 2000) and U.S. Pat. No. 7,134,454 B2 (MONTMINY, 2006).

Most of the caps disclosed in these US patents have the disadvantage to include complex mechanisms that may be partially or fully in contact with the atmosphere or with the solvent present in the tank closed by the cap, and therefore are prone to rust and mechanism jamming. Furthermore, most of the caps disclosed in these US patents require a pulling action of a component along a longitudinal axis of the cap in order to activate the latches into a disengaged configuration, which may be difficult when some other components of the mechanism are rusted or jammed, for the reasons described above. Furthermore, in most of the above-mentioned security caps, the latches thereof are engaged with a corresponding groove of the pipe via a pivotal movement which, in some cases, requires an additional and substantial effort through a pulling action of the complex mechanisms of the security cap in order to disengage the security cap from the open end of the pipe. Additionally, and in most of the caps disclosed in the above-mentioned US patents, the latches of the security caps are exposed, thereby also making them more prone to rust and/or jamming, as well as vandalism and/or breakage, which is also very undesirable.

Hence, in light of the aforementioned, there is a need for an improved device, which by virtue of its design and components, would be able to overcome some of the above-discussed prior art problems, and/or at the very least would be able to address some of the above-discussed concerns.

SUMMARY OF THE INVENTION

The object of the present invention is to provide a security cap which, by virtue of its design and components, satisfies some of the above-mentioned needs and is thus an improvement over other related caps and/or securing methods known in the prior art.

In accordance with the present invention, the above object is achieved, as will be easily understood, with a security cap such as the one briefly described herein and such as the one exemplified in the accompanying drawings.

More particularly, and according to the present invention, there is provided a security cap for selectively closing an open end of a pipe, the security cap comprising:

an inner cap assembly, the inner cap assembly having a portion engageable with the open end of the pipe;

an outer cap assembly mounted about the inner cap assembly and rotatable with respect to the same, the outer cap assembly having a portion engageable with an outer portion of the open end of the pipe, and along with the inner cap assembly, being intended to cover the open end of the pipe;

at least one latch cooperable with the inner and outer cap assemblies, and displacable with respect to said cap assemblies, so as to be operated between first and second configurations, wherein in the first configuration, said at least one latch is drawn away from an outer groove of the open end of the pipe thereby enabling the security cap to be removed from said open end of the pipe, and wherein in the second configuration, the at least one latch is engaged with the outer groove thereby preventing the security cap from being removed from the open end of the pipe; and a driving assembly operatively disposed between the inner and outer cap assemblies, and cooperable with the same, as well as with the at least one latch, for selectively driving said at least one latch between the first and second configurations via a given rotation of the outer cap assembly with respect to the inner cap assembly of the security cap.

The driving assemblies which may be used according to the present invention are various, but according to a preferred embodiment of the invention, the driving assembly comprises a railing track defined by an inner portion of the outer cap assembly and configured for receiving a given latch cooperable with the inner cap assembly, the railing track extending about an inner area of the outer cap assembly and having a varying radius of curvature between a given range of rotation of the outer cap assembly such that the given latch is urged transversally (or "radially") by the railing track with respect to the inner cap assembly when the outer cap assembly is rotated with respect to said inner cap assembly.

Preferably also, the security cap comprises a locking assembly having locking components cooperable with the cap assemblies, for preventing the outer cap assembly from being rotated with respect to the inner cap assembly in order to maintain the security cap in a locked configuration.

Preferably also, the security cap comprises a biasing assembly for biasing the security cap into a locking configuration by default.

Preferably also, the security cap comprises an unlocking assembly cooperable with the cap assemblies, and with the locking assembly, for allowing the outer cap assembly to be rotated with respect to the inner cap assembly in order to allow the security cap to be operated in an unlocked configuration.

Preferably also, the inner and outer cap assemblies are provided with corresponding seals for closing the open end of the pipe in a substantially sealed manner.

According to yet another aspect of the present invention, there is also provided a method of installing and/or operating the above-mentioned security cap.

According to yet another aspect of the present invention, there is also provided a kit with components for assembling the above-mentioned security cap.

According to yet another aspect of the present invention, there is also provided a method of assembling components of the above-mentioned kit.

According to yet another aspect of the present invention, there is also provided a container comprising a pipe with an open end having been closed off with the above-mentioned security cap and/or kit.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
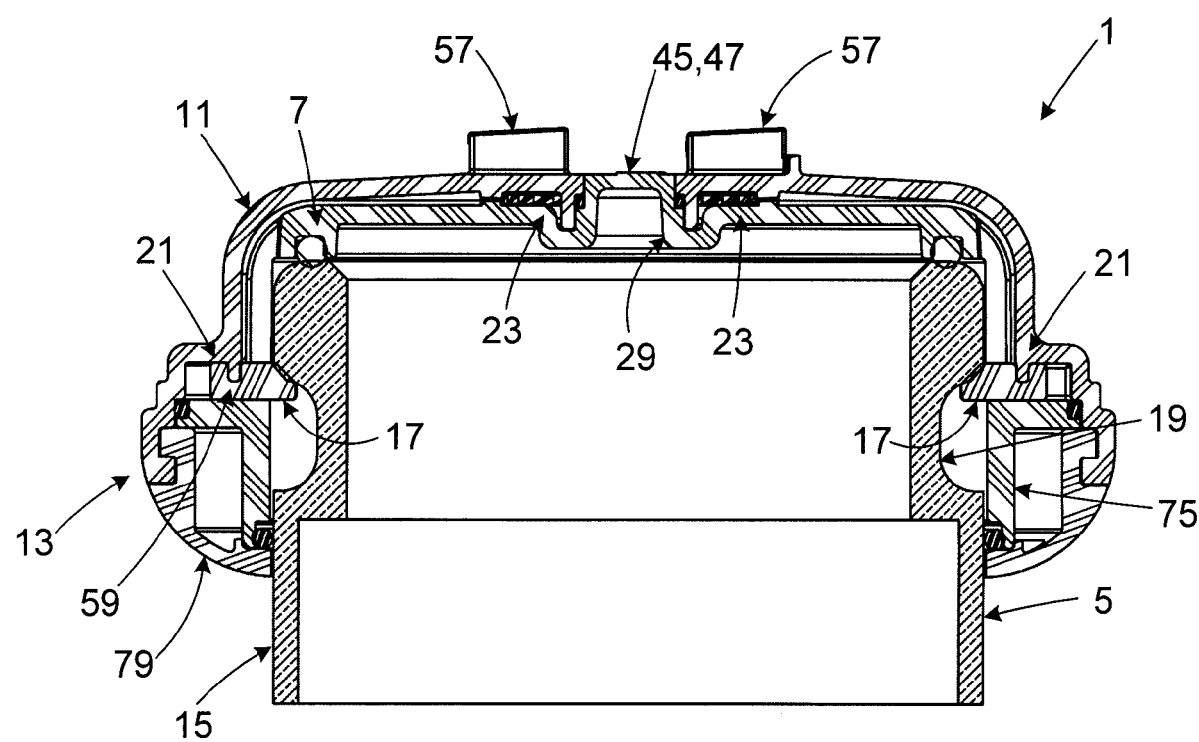
FIG. 1 is a cross-sectional view of a security cap mounted about an open end of a pipe according to a first preferred embodiment of the present invention, the security cap being shown in an engaged configuration.

In the following description, the same numerical references refer to similar elements. The embodiments, geometrical configurations, materials mentioned and/or dimensions shown in the figures or described in the present description are preferred embodiments only, given for exemplification purposes only.

In the context of the present description, the expression "cap" or "plug" includes all types of devices used for selectively opening and closing an open end 3 of a pipe 5, such as those typically of reservoirs or containers used in the oil and gas industry, and/or other related industries, such as the fuel distribution industry for example, as can be easily understood by a person skilled in the art. Indeed, although the present invention was primarily designed for such industries, it may be used with other kinds of applications, and in various other fields, whether in agriculture, construction and/or the like, where an open end 3 of a pipe 5, which may or may not be operatively connected to a corresponding container, would require to be closed off selectively and securely. For this reason, the expressions "cap", "plug", "pipe", "tube", "container", "gas", "oil", "fuel", "solvent", etc. should not be taken as to limit the scope of the present invention and includes all other kinds of applications or items with which the present invention may be used and could be useful.

Moreover, in the context of the present description, the expressions "system", "cap", "device", "plug", "unit", and "assembly", as well as any other equivalent expressions and/or compound words thereof, may be used interchangeably. The same applies for any other mutually equivalent expressions, such as "gas", "fuel", "solvent" and "fluid" for example, as well as "tube", "pipe" and "cylinder", as also apparent to a person skilled in the art.

In addition, although the preferred embodiment of the present invention as illustrated in the accompanying drawings comprises various components, and although the preferred embodiment of the security cap 1 and corresponding parts of the present invention as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the security cap 1 according to the present invention, as will be briefly explained herein and as can be easily inferred herefrom, without departing from the scope of the invention.

Broadly described, the security cap 1 according to the present invention, as exemplified in the accompanying drawings, is a security cap 1 for selectively opening and closing an open end 3 of a pipe 5, the security cap 1 comprising an inner cap assembly 7, an outer cap assembly 11, at least one latch 17, and a driving assembly 21. An important aspect of the present invention resides in the fact that the at least one latch 17 of the security cap 1 is protected by the inner and outer cap assemblies 7,11, and is "drivable" via a rotation of the outer cap assembly 11 with respect to the inner cap assembly 7, as can be easily understood when contrasting FIGS. 1 and 2.

Indeed, as can be easily understood from these figures, the inner cap assembly 7 of the security cap 1 has a portion engageable with the open end 3 of the pipe 5. Preferably, this portion of the inner cap assembly 7 is one that engages an outer portion of the pipe 5, as exemplified in FIG. 1, but is worth mentioning also that the present security cap 1 could be modified so that the inner cap assembly 7 thereof would have a corresponding inner portion being insertable or abutting with an inner portion of the open end 3 of the pipe 5, depending on the particular applications, and the desired end results intended for the security cap 1, as can be easily understood by a person skilled in the art.

Figure 2:
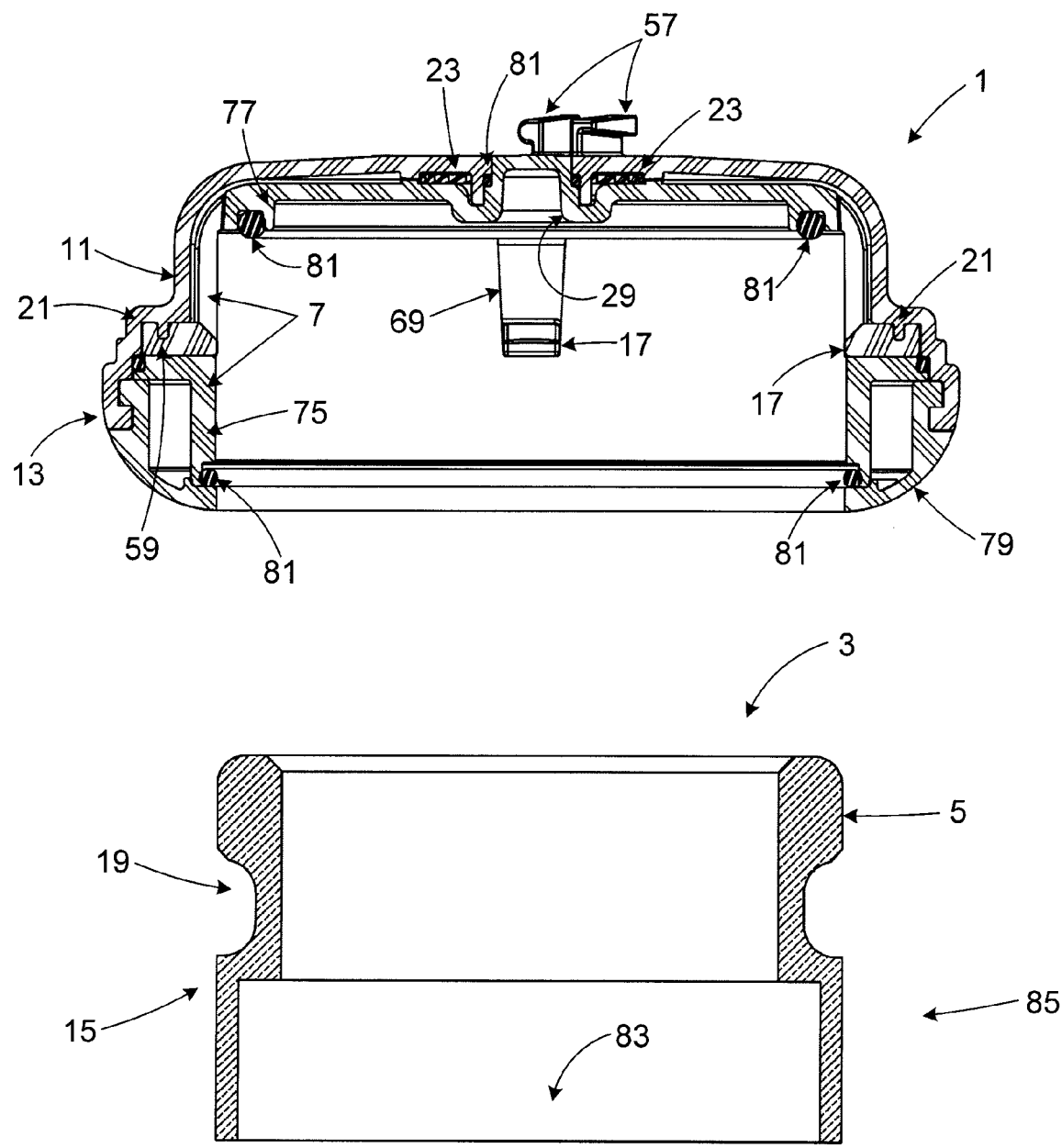
FIG. 2 is another cross-sectional view of what is shown in FIG. 1, the security cap being now shown in a disengaged configuration and being removed from the open end of the pipe according to a preferred embodiment of the present invention.
Figure 3:
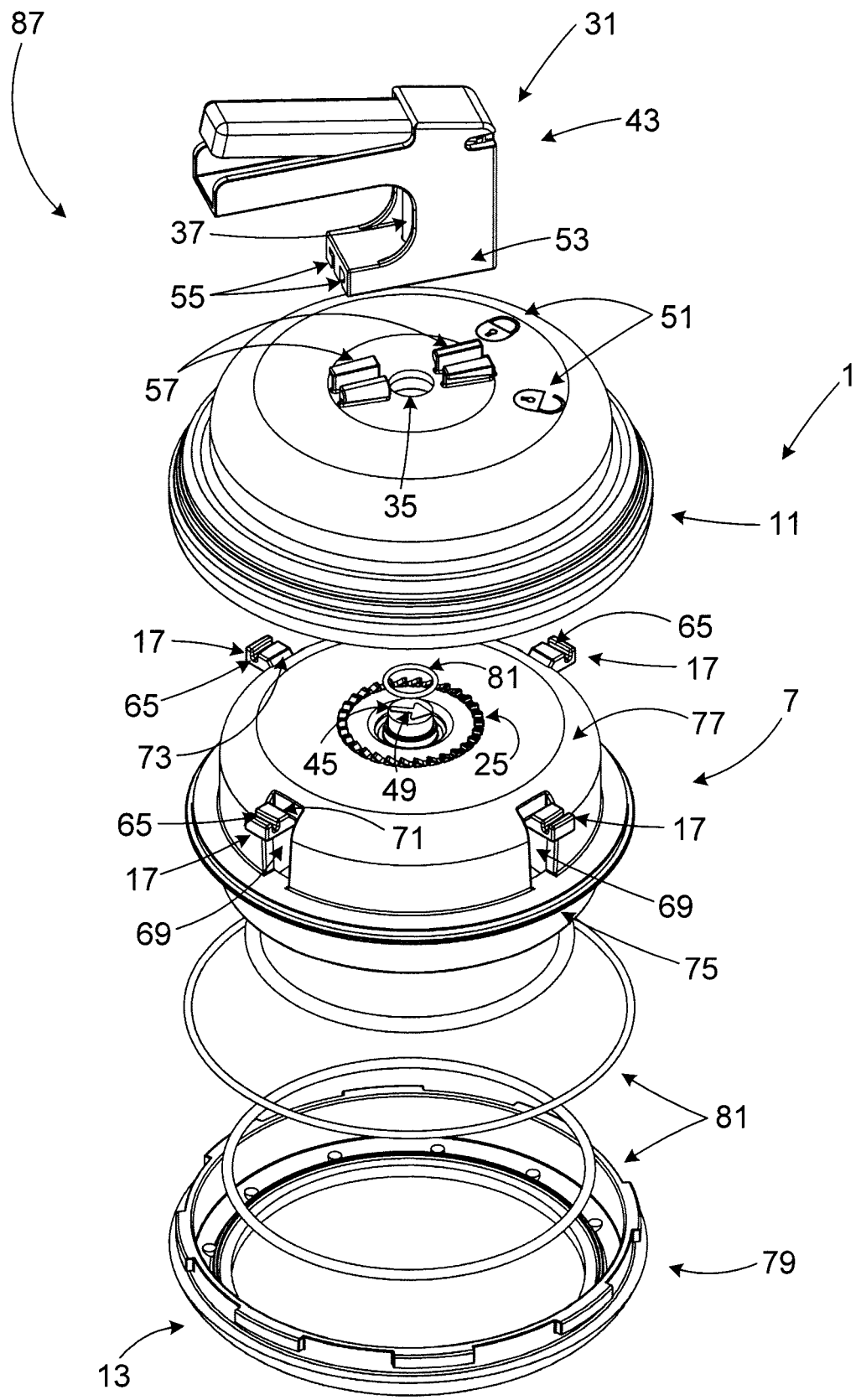
FIG. 3 is an exploded view of components of a security cap according to another preferred embodiment of the present invention, the security cap being shown with a lever being removably mountable onto the outer cap assembly of the security cap.

As can also be easily understood from the accompanying figures, and more particularly from FIGS. 1-3, according to a preferred embodiment of the present invention, the outer cap assembly 11 is mounted about the inner cap assembly 7 and is rotatable with respect to the same. The outer cap assembly 11 has a portion 13 operatively engageable with an outer portion 15 of the open end 3 of the pipe 5, and along with the inner cap assembly 7, is intended to cover the open end 3 of the pipe 5. It is worth mentioning also, that the inner and outer assemblies 7,11 may take on various shapes and forms other than those exemplified in the accompanying drawings, so long as when mounted together, they be preferably intended to appropriately cover and close off the open end 3 of the pipe 5, as can be easily understood by a person skilled in the art.

As can also be easily understood when referring to the accompanying figures, and when contrasting FIGS. 1 and 2, each latch 17 of the security cap 1 is cooperable with the inner and outer cap assemblies 7,11, and is displaceable with respect to said cap assemblies 7,11 so as to be operated between first and second configurations, wherein in the first (disengaged, unsecured, unlocked, etc.) configuration, each latch 17 is drawn away from an outer groove 19 of the open end 3 of the pipe 5 thereby enabling the security cap 1 to be removed from said open end 3 of the pipe 5, and wherein in the second (engaged, secured, locked, etc.) configuration, each latch 17 is engaged with the outer groove 19 thereby preventing the security cap 1 from being removed from the open end 3 of the pipe 5.

As previously explained, the driving assembly intended to displace each latch 17 transversally or radially with respect to the cap assemblies 7,11, may be various, but in general terms, the driving assembly 21 is operatively disposed between the inner and outer cap assemblies 7,11, and cooperable with the same, as well as with each latch 17, for selectively driving (pushing, displacing, moving, urging, etc.) each latch 17 between the first and second configurations via a given rotation of the outer cap assembly 11 with respect to the inner cap assembly 7 of the security cap 1.

Preferably also, the security cap 1 comprises a locking assembly 23 having locking components cooperable with the cap assemblies 7,11 for preventing the outer cap assembly 11 from being rotated with respect to the inner cap assembly 7 in order to maintain the security cap 1 in a locked configuration.

Figure 4:
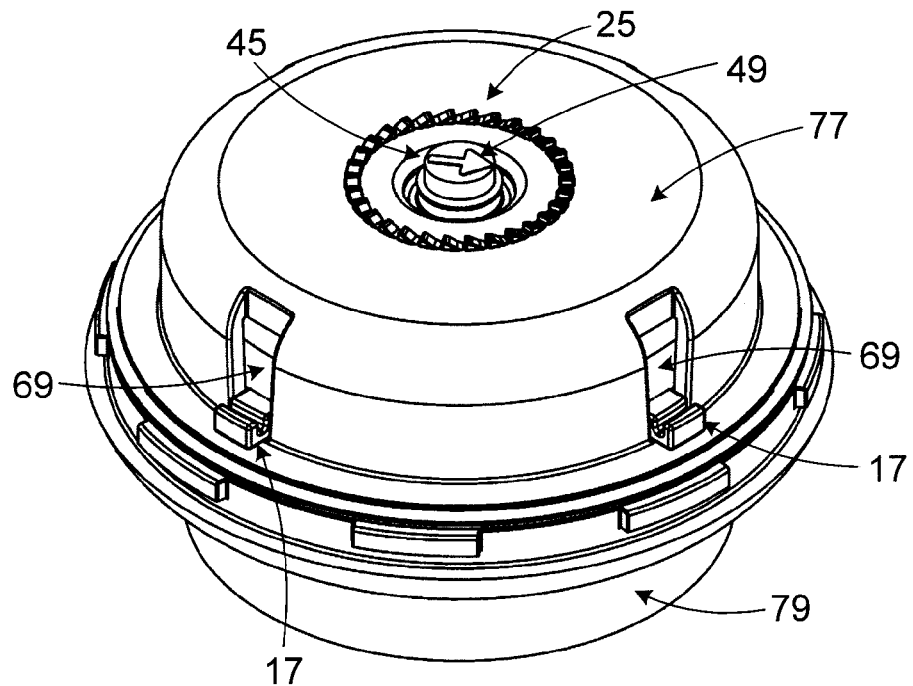
FIG. 4 is a top perspective view of the inner cap assembly of FIG. 3, being further shown with latches according to a preferred embodiment of the present invention.
Figure 5:
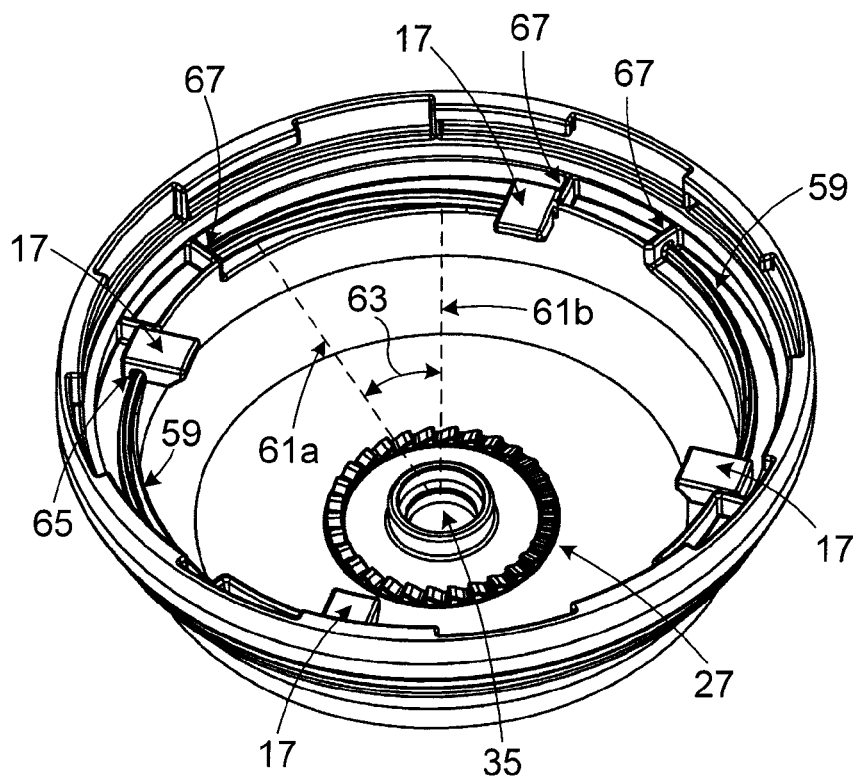
FIG. 5 is a bottom perspective view of the outer cap assembly of FIG. 3, being further shown provided with latches according to a preferred embodiment of the present invention.

Similarly to the driving assembly 21, the locking assembly 23 according to the present invention may take on various embodiments, but according to a preferred embodiment thereof, and as better illustrated in FIGS. 3-5, the locking assembly 23 comprises a set of first and second locking components 25,27, a first locking component 25 being disposed on an outer portion of the inner cap assembly 7 and a second locking component 27 being disposed on an inner portion of the outer cap assembly 11, the first locking component 25 of the inner cap assembly 7 being engageable with the second locking component 27 of the outer cap assembly 11 when the security cap 1 is in the locked configuration for preventing the outer cap assembly 11 from being rotated with respect to the inner cap assembly 7.

Preferably, the locking components 25,27 comprise a series of complementary and interlocking gears disposed respectively on the outer portion of the inner cap assembly 7 and on the inner portion of the outer cap assembly 11, as can be easily understood when referring to FIGS. 4 and 5. Once again, the locking assembly 23 which may be used according to the present invention in order to prevent the outer cap assembly 11 from being rotated with respect to inner cap assembly 7 in order to maintain the security cap 1 in a given configuration, whether an engaged configuration or a disengaged configuration, may be various, so long as the locking assembly 23 provides a positive engagement or locking of one cap assembly 7,11 with respect to the other 11,7. Indeed, another very simple locking assembly 23 which could be used according to the present invention would be simply to have at least one pin projecting from a corresponding cap assembly 7,11, and being removably engageable into a corresponding at least one socket provided on the other cap assembly 11,7 in order to enable to selectively have a positive engagement thereinbetween, and thus prevent rotation of the outer cap assembly 11 with respect to the inner cap assembly 7 in order to maintain the security cap 1 in a given mode, according to the intentions of a user of the security cap 1.

According to another preferred embodiment of the present invention, the security cap 1 comprises a biasing assembly 29 for biasing the security cap 1 into a locking configuration by default. As will be explained in greater detail hereinbelow, by doing so, the security cap 1 being designed as such, with the presence of a biasing assembly 29, preferably requires the need of a special "key" in order to deactivate the locking configuration which is normally operated by default, thus providing an additional security feature to the present security cap 1, and preventing undesirable tampering thereof by unauthorized people.

Similarly to the driving and locking assemblies 21,23, the biasing assembly 29 of the present invention may take on various shapes and forms in order to achieve the above-mentioned result, as can be easily understood by a person skilled in the art.

Figure 7:
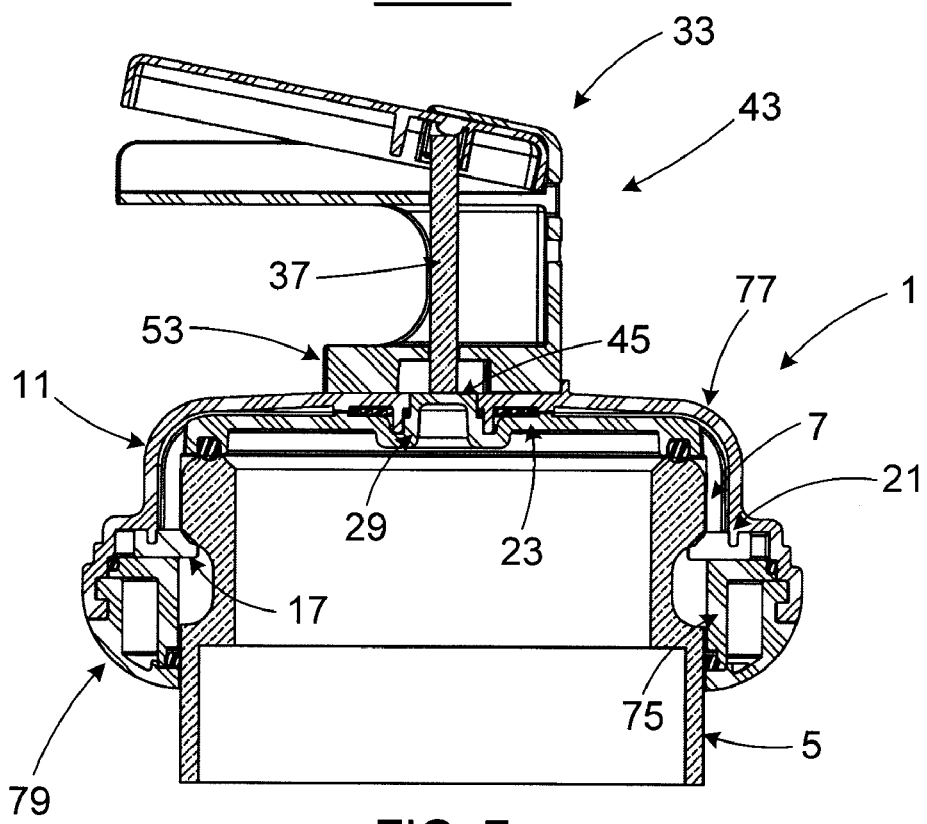
FIG. 7 is a cross-sectional view of the security cap of FIG. 3 being shown in an assembled state and mounted about an open end of a pipe, the security cap being further shown in an engaged configuration.
Figure 8:
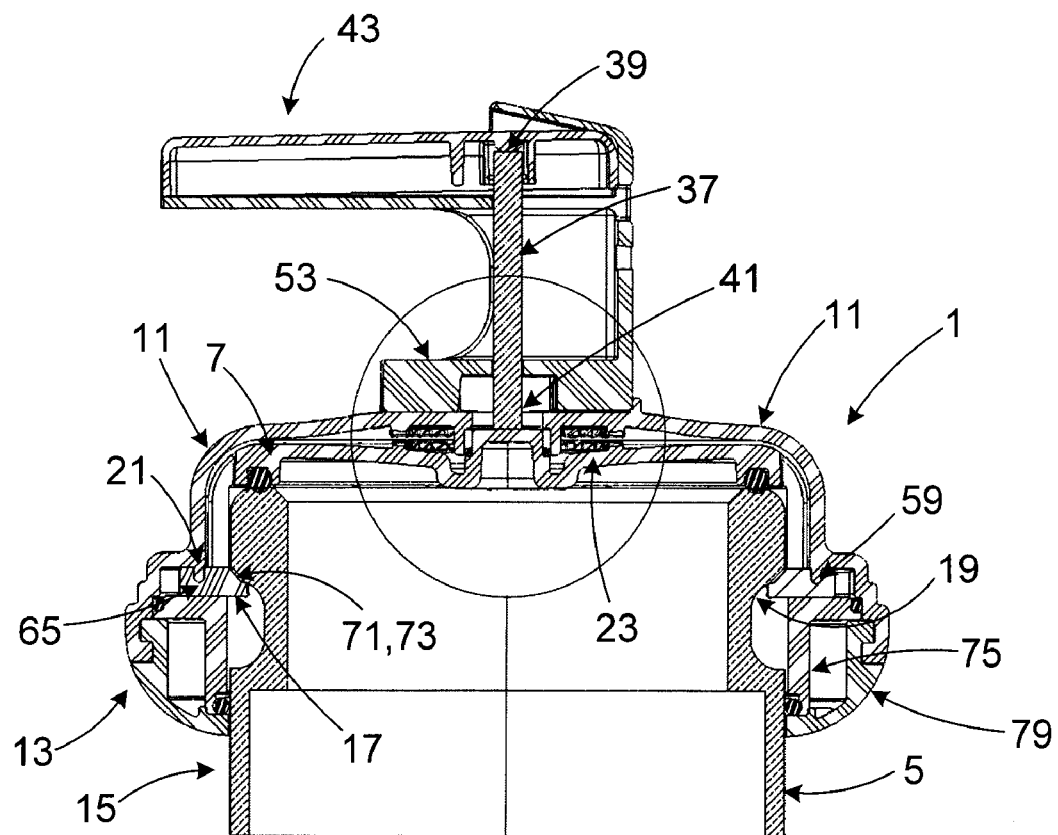
FIG. 8 is another cross-sectional of what is shown in FIG. 7, the first locking component of the inner cap assembly being now shown disengaged from the second locking component of the outer cap assembly via the actuating assembly of the security cap according to a preferred embodiment of the present invention.

According to a preferred embodiment of the present invention, the biasing assembly 29 is preferably provided by the inner cap assembly 7, which is preferably made of a resilient material, and is further positioned, shaped and sized with respect to the outer cap assembly 11 so that the first locking component 25 of the inner cap assembly 7 is biased by default into a locking configuration with the second locking component 27 of the outer cap assembly 11, as can be easily understood when contrasting FIGS. 7 and 8. Indeed, and according to a preferred embodiment of the present invention, as will be explained in greater detail hereinbelow, an unlocking or an actuating assembly 31,33 is required in order to disengage the locking assembly 23, and more particularly, for separating the first locking component 25 with respect to the second locking component 27, as better shown in FIG. 9, in order to allow the outer cap assembly 11 to be rotated with respect to the inner cap assembly 7.

Indeed, and as shown, the security cap 1 preferably comprises an unlocking assembly 31 cooperable with the cap assemblies 7,11 and with the locking assembly 23, for allowing the outer cap assembly 11 to be rotated with respect to the inner cap assembly 7 in order to allow the security cap 1 to be operated in an unlocked configuration.

Preferably also, this unlocking assembly 31 may take on the form of an actuating assembly 33 for actuating the first locking component 25 of the inner cap assembly 7 away from the second locking component 27 of the outer cap assembly 11 in order to allow the outer cap assembly 11 to be rotated with respect to the inner cap assembly 7.

Figure 9:
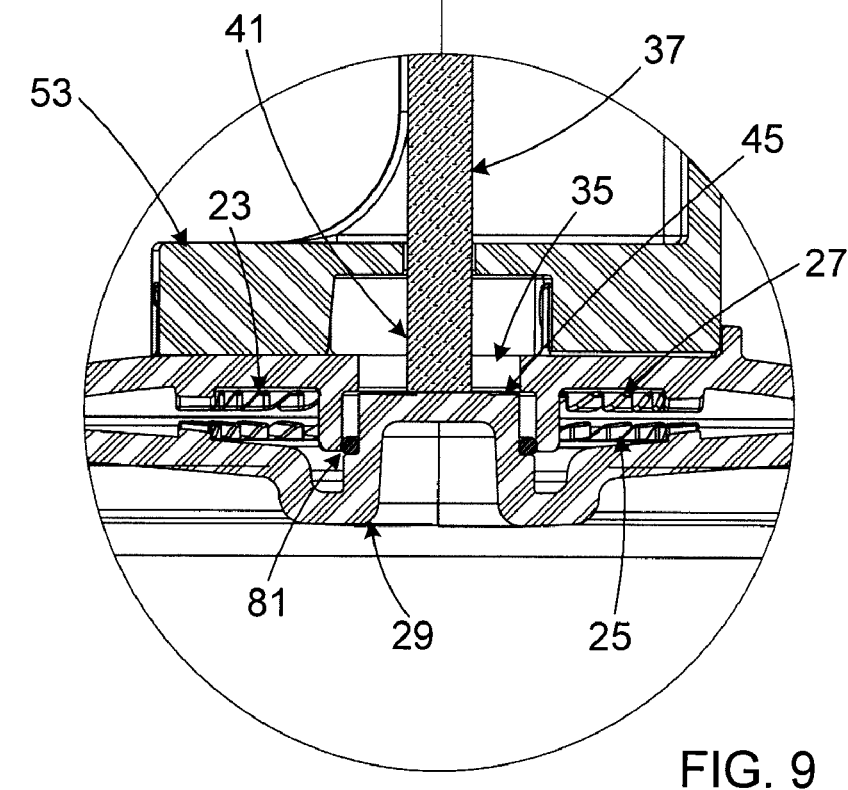
FIG. 9 is an enlarged view of a portion of what is shown in FIG. 8.

Similarly to the above-described assemblies of the security cap 1, the actuating assembly 33 according to the present invention may take on various forms and shapes, but according to a preferred embodiment thereof, the actuating assembly 33 comprises a hole 35, an actuator rod 37, a lever 43 and a button 45, as better exemplified in FIGS. 8 and 9. Preferably, the hole 35 is provided through the outer cap assembly 11. The actuator rod 37 is displaceable through the hole 35, and has first and second extremities 39,41. The lever 43 is cooperable with the first extremity 39 of the actuator rod 37 for displacing the same through the hole 35 of the outer cap assembly 11 and for driving the second extremity 41 of the actuator rod 37 against a button 45 of the inner cap assembly 7 in order to disengage the first locking component 25 of the inner cap assembly 7 away from the second locking component 27 of the outer cap assembly 11 in order to allow the outer cap assembly 11 to be rotated with respect to the inner cap assembly 7.

As better exemplified in FIGS. 1-7, the button 45 protrudes from an outer surface of the inner cap assembly 7 and has a substantially flat top surface 47, the top surface 47 being substantially flush with an outer surface of the outer cap assembly 11 when the security cap 1 is in a locked configuration (see FIGS. 1 and 2).

Figure 6:
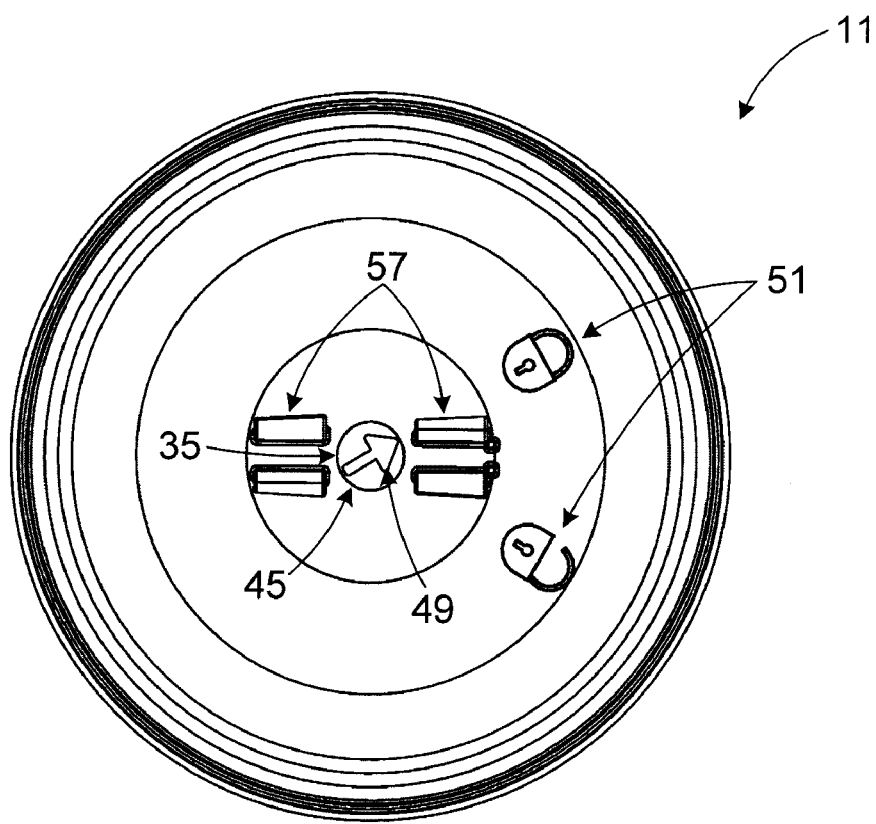
FIG. 6 is a top plan view of the outer cap assembly of FIG. 3 being shown mounted about the inner cap assembly of FIG. 4.

As better shown in FIGS. 4 and 6, the top surface 47 of the button 45 is preferably provided with an indicator 49 alignable with a corresponding symbol 51 provided on the outer surface of the outer cap assembly 11 to indicate a given configuration of the security cap 1. For example, the corresponding symbols 51 may comprise a pair of symbols 51, namely a first symbol 51 representing a lock being "locked", and a second symbol 51 representing a lock being "unlocked", and the various components of the security cap 1 are preferably designed so that when the indicator 49 is aligned with the symbol 51 of the lock being "locked", this would mean that it would correspond to a configuration of the security cap 1 where the latches 17 are engaged with the outer groove 19 of the pipe 5, whereas should the indicator 49 be aligned with the symbol 51 of the lock "unlocked", this would represent that the security cap 1 is in a configuration where the latches 17 are drawn away from the outer groove 19 and whereby the security cap 1 can be removed from said open end 3 of the pipe 5. It is worth mentioning however that various other corresponding symbols 51 and manners of indicating all given configurations of the security cap 1, whether engaged or disengaged, depending whether the latches 17 are engaged or disengaged with the outer groove 19 of the pipe 5, may be appropriately used according to the present invention, as apparent to a person skilled in the art.

As previously explained, the security cap 1 according to a preferred embodiment of the present invention preferably comprises a "key" for unlocking the locking assembly 23 of the security cap 1, and this key preferably takes the form of a lever 43 which is preferably removably mountable onto the outer cap assembly 11, as can be easily understood when contrasting FIGS. 3 and 8 for example. Once again, the manners in which the lever 43 may be removably mountable onto the outer cap assembly 11 may be various, as apparent to a person skilled in the art, but according to a preferred embodiment of the present invention, the lever 43 comprises a base 53 having at least one female component 55 being removably engageable into a corresponding male component 57 provided on the outer portion of the outer cap assembly 11. As better shown in FIG. 3, and according to the preferred embodiment of the present invention, the base 53 of the lever 43 preferably comprises at least a pair of female components 55 being slidably insertable into at least a pair of corresponding male components 57.

As previously explained, and similarly to the other assemblies, the security cap 1, the driving assembly 21 according to the present invention may take on various forms and shapes, depending on the particular applications and the desired end results intended for the security cap 1, as can be easily understood by a person skilled in the art. Generally speaking, the driving assembly 21 according to the present invention is intended to selectively "drive" (push, displace, move, urge, etc.) each latch 17 between the first and second configurations via a given rotation of the outer cap assembly 11 with respect to the inner cap assembly 7 of the security cap 1, and preferably also, the driving assembly 21 is intended to drive each latch 17 transversally (or "radially") with respect to the cap assemblies 7,11, such that each latch 17 is not displaceable in a "pivotal" manner, but rather preferably, in a substantially "linear" manner, and radially with respect to the security cap 1, each latch 17 being preferably aligned towards the center of the security cap 1, and displacable linearly along a corresponding radius thereof, when the outer cap assembly 11 is rotated with respect to the inner cap assembly 7, or vise versa.

According to a preferred embodiment of the present invention, considered to be reliable and easy to manufacture, as well as to assemble, and as better shown in FIGS. 1, 2 and 5, the driving assembly 21 comprises a railing track 59 defined by an inner portion of the outer cap assembly 11 and configured for receiving a given latch 17 cooperable with the inner cap assembly 7, the railing track 59 extending about an inner area of the outer cap assembly 11 and having a varying radius of curvature $61a,61b$ between a given range of rotation 63 of the outer cap assembly 11 such that the given latch 17 is urged transversally by the railing track 59 with respect to the inner cap assembly 7 when the outer cap assembly 11 is rotated with respect to said inner cap assembly 7, as can be easily understood for example when contrasting FIGS. 1 and 2, wherein in FIG. 1, the railing track has a shorter radius of curvature $61b$, and is thus closer to the center of the security cap 1, whereas in FIG. 2, the railing track has a bigger radius of curvature $61a$, and is thus further away from the center of the security cap 1, which explains that said railing track 59 has driven or urged the corresponding latch 17 away from the center of the security cap 1, into a "disengaged" configuration.

Reference is also made to FIGS. 5 and 8, where there is shown that each latch 17 preferably comprises a groove 65 for engaging the railing track 59, and wherein preferably also, the railing track 59 is provided with a pair of end stoppers 67 for containing a given latch 17 on a given railing track 59, as can be easily understood when referring more particularly to FIG. 5.

As better shown in FIGS. 3 and 4, the inner cap assembly 7 preferably comprises a given slot 69 being positioned, shaped and sized for allowing a given latch 17 to extend therethrough in order to engage the outer groove 19 of the open end 3 of the pipe 5 when operated in the second configuration.

As better shown in FIG. 8, each given latch 17 preferably comprises a tip 71 having a slanted contact surface 73 for engaging the outer groove 19 of the open end 3 of the pipe 5, and the security cap 1 preferably comprises four latches 17, as better shown in FIGS. 3 and 5.

According to a preferred embodiment of the present invention, and as better shown in FIGS. 1-4, the inner cap assembly 7 comprises a collar 75 engageable with an outer portion of the open end 3 of the pipe 5, and a dome 77 covering the collar 75, and being nestable into the outer cap assembly 11. Preferably also, the hole 35, actuator rod 37 and button 45 extend along a longitudinal axis of the security cap 1, as can be easily understood from FIGS. 3, 8 and 9, and preferably also, the inner cap assembly 7 is mounted concentrically within the outer cap assembly 11. Preferably also, the security cap 1 further comprises a holding ring 79 for holding both cap assemblies 7,11 together, and said holding ring 79 may be considered a separate piece, or simply an "extension" of the outer cap assembly 11, depending on the particular embodiment of the present invention. Indeed, it is worth mentioning that although a holding ring 79 is provided for holding both cap assemblies 7,11 together, the outer cap assembly 11 nevertheless has a portion operatively engageable with an outer portion of the pipe 5 via the above-mentioned holding ring 79.

As can be easily understood by a person skilled in the art when referring to the accompanying drawings, and according to a preferred embodiment of the present invention, the inner and outer cap assemblies 7,11 are provided with corresponding seals 81 for closing the open end 3 of the pipe 5 in a substantially sealed manner.

According to another aspect of the present invention, there is also provided a gas container 83 for containing gas, the gas container 83 comprising a pipe 5 operatively connected to the gas container 83, the pipe 5 having an open end 3 through which gas can be introduced into the gas container 83 and through which gas can be extracted; an adapter 85 removably mountable onto said open end 3 of the pipe 5; and a security cap 1 such as the one described herein, the security cap 1 being selectively closable onto the open end 3 of the pipe 5 via the adapter 85.

According to another aspect of the present invention, there is also provided a kit 87 for assembling a security cap 1 intended for selectively closing an open end 3 of a pipe 5, the kit 87 comprising:
an inner cap assembly 7, the inner cap assembly 7 having a portion engageable with the open end 3 of the pipe 5;
an outer cap assembly 11 mountable about the inner cap assembly 7 and rotatable with respect to the same, the outer cap assembly 11 having a portion 13 engageable with an outer portion 15 of the open end 3 of the pipe 5, and along with the inner cap assembly 7, being intended to cover the open end 3 of the pipe 5;
at least one latch 17 cooperable with the inner and outer cap assemblies 7,11 when the security cap 1 is assembled, and displacable with respect to said cap assemblies 7,11 so as to be operated between first and second configurations, wherein in the first configuration, said at least one latch 17 is drawn away from an outer groove 19 of the open end 3 of the pipe 5 thereby enabling the security cap 1 to be removed from said open end 3 of the pipe 5, and wherein in the second configuration, the at least one latch 17 is engaged with the outer groove 19 thereby preventing the security cap 1 from being removed from the open end 3 of the pipe 5; and
a driving assembly 21 operatively disposable between the inner and outer cap assemblies 7,11, and cooperable with the same, as well as with the at least one latch 17, for selectively driving said at least one latch 17 between the first and second configurations via a given rotation of the outer cap assembly 11 with respect to the inner cap assembly 7 of the security cap 1.

Preferably also, the kit 87 further comprises at least one additional component such as the ones described herein.

Finally, and according to the present invention, the security cap 1 and corresponding parts are preferably made of substantially rigid materials, such as metallic materials (stainless steel, etc.), hardened polymers, composite materials, and/or the like, whereas other components thereof according to the present invention, in order to achieve the resulting advantages briefly discussed herein, are preferably made of a suitably malleable and resilient material, such as a polymeric material (plastic, rubber, etc.), and/or the like, depending on the particular applications for which the security cap 1 and corresponding container are intended for and the different parameters in cause, as apparent to a person skilled in the art.

The present invention is a more compact, easier to use, easier to maintain, and more cost effective system than those available in the prior art. For example, according to the present invention, the latches 17 of the security cap 1 are not exposed to an outside environment, being protected internally between the inner and outer cap assemblies 7,11, and preferably also, instead of having to pull one or several components in order to activate the security cap 1 in an engaged or a disengaged configuration, such configurations are operated by simply pivoting or rotating the outer cap assembly 11 with respect to the inner cap assembly 7, thereby providing several advantages over the conventional security caps known in the art, and as discussed hereinabove.

Of course, numerous modifications could be made to the above-described embodiments without departing from the scope of the invention, as defined in the appended claims.

The invention claimed is:

1. A security cap for selectively closing an open end of a pipe, the security cap including:
   an inner cap assembly, the inner cap assembly having a portion engageable with the open end of the pipe;
   an outer cap assembly mounted about the inner cap assembly and rotatable with respect to the same, the outer cap assembly the inner cap assembly being intended to cover the open end of the pipe, the inner cap assembly being mounted concentrically within the outer cap assembly;
   at least one latch cooperable with the inner and outer cap assemblies, and displacable with respect to said cap assemblies so as to be operated between first and second configurations, wherein in the first configuration, said at least one latch is drawn away from an outer groove of the open end of the pipe thereby enabling the security cap to be removed from said open end of the pipe, and wherein in the second configuration, the at least one latch is engaged with the outer groove thereby preventing the security cap from being removed from the open end of the pipe;
   a driving assembly operatively disposed between the inner and outer cap assemblies, and cooperable with the same, as well as with the at least one latch, for selectively driving said at least one latch between the first and second configurations via a given rotation of the outer cap assembly with respect to the inner cap assembly of the security cap; and
   a holding ring for holding both cap assemblies together, the holding ring being engageable with an outer portion of the open end of the pipe.

2. The security cap according to claim 1, wherein the security cap includes a locking assembly having locking components cooperable with the cap assemblies for preventing the outer cap assembly from being rotated with respect to the inner cap assembly in order to maintain the security cap in a locked configuration.

3. The security cap according to claim 2, wherein the locking assembly includes a set of first and second locking components, the first locking component being disposed on an outer portion of the inner cap assembly and the second locking component being disposed on an inner portion of the outer cap assembly, the first locking component of the inner cap assembly being engageable with the second locking component of the outer cap assembly when the security cap is in the locked configuration for preventing the outer cap assembly from being rotated with respect to the inner cap assembly.

4. A security cap for selectively closing an open end of a pipe, the security cap including:
   an inner cap assembly, the inner cap assembly having a portion engageable with the open end of the pipe;
   an outer cap assembly mounted about the inner cap assembly and rotatable with respect to the same, the outer cap assembly and the inner cap assembly being intended to cover the open end of the pipe;
   at least one latch cooperable with the inner and outer cap assemblies, and displacable with respect to said cap assemblies so as to be operated between first and second configurations, wherein in the first configuration, said at least one latch is drawn away from an outer groove of the open end of the pipe thereby enabling the security cap to be removed from said open end of the pipe, and wherein in the second configuration, the at least one latch is engaged with the outer groove thereby preventing the security cap from being removed from the open end of the pipe;
   a driving assembly operatively disposed between the inner and outer cap assemblies, and cooperable with the same, as well as with the at least one latch, for selectively driving said at least one latch between the first and second configurations via a given rotation of the outer cap assembly with respect to the inner cap assembly of the security cap;
   a locking assembly having locking components cooperable with the cap assemblies for preventing the outer cap assembly from being rotated with respect to the inner cap assembly in order to maintain the security cap in a locked configuration; and
   a biasing assembly for biasing the security cap into the locked configuration by default.

5. The security cap according to claim 4, wherein the biasing assembly includes a portion of the inner cap assembly being made of a resilient material, the resilient material portion being positioned, shaped and sized with respect to the outer cap assembly so that a first of the locking components is biased by default into the locked configuration with a second of the locking components, the first locking component being connected to the inner cap assembly and the second locking component being connected to the outer cap assembly.

6. The security cap according to claim 5, wherein the first and second locking components include a series of complementary and interlocking gears disposed respectively on an outer portion of the inner cap assembly and on an inner portion of the outer cap assembly.

7. The security cap according to claim 5, wherein the security cap includes an unlocking assembly cooperable with the cap assemblies and with the locking assembly, for allowing the outer cap assembly to be rotated with respect to the inner cap assembly in order to allow the security cap to be set in an unlocked configuration.

8. The security cap according to claim 3, wherein the security cap includes an actuating assembly for actuating the first locking component of the inner cap assembly away from the second locking component of the outer cap assembly in order to allow the outer cap assembly to be rotated with respect to the inner cap assembly.

9. The security cap according to claim 8, wherein the actuating assembly includes:
   a rod displaceable through a hole provided through the outer cap assembly, the rod having first and second extremities; and
   a lever cooperable with a first extremity of the rod for driving a second extremity of the rod against a button of the inner cap assembly in order to move the first locking component of the inner cap assembly away from the second locking component of the outer cap assembly, thereby allowing the outer cap assembly to be rotated with respect to the inner cap assembly.

10. The security cap according to claim 9, wherein the button protrudes from an outer surface of the inner cap assembly and has a substantially flat top surface, the top surface being substantially flush with an outer top surface of the outer cap assembly when the security cap is in the locked configuration.

11. The security cap according to claim 10, wherein the top surface of the button is provided with an indicator alignable with a corresponding symbol provided on the outer top surface of the outer cap assembly to indicate a given configuration of the security cap.

12. The security cap according to claim 9, wherein the hole, the rod and the button extend along a longitudinal axis of the security cap.

13. The security cap according to claim 9, wherein the lever includes a base having at least one component being removably engageable with a corresponding component provided on outer top surface of the outer cap assembly.

14. The security cap according to claim 1, wherein the driving assembly includes a railing track defined by an inner portion of the outer cap assembly and configured for receiving the at least one latch cooperable with the inner cap assembly, the railing track having a varying radius of curvature between a given range of rotation of the outer cap assembly such that the at least one latch is urged transversally by the railing track with respect to the inner cap assembly when the outer cap assembly is rotated with respect to said inner cap assembly.

15. The security cap according to claim 14, wherein the at least one latch includes a groove for engaging the railing track.

16. The security cap according to claim 14, wherein the railing track is provided with a pair of end stoppers for containing the at least one latch on said railing track.

17. The security cap according to claim 1, wherein the inner cap assembly includes at least one slot being positioned, shaped and sized for allowing the at least one latch to extend therethrough in order to engage the outer groove of the open end of the pipe when set in the second configuration.

18. The security cap according to claim 1, wherein the at least one latch includes a tip having a slanted contact surface for engaging the outer groove of the open end of the pipe.

19. The security cap according to claim 1, wherein said at least one latch includes a plurality of latches.

20. The security cap according to claim 1, wherein the inner cap assembly includes:
   a collar engageable with the outer portion of the open end of the pipe; and
   a dome connected to the collar and nestable into the outer cap assembly.

21. The security cap according to claim 1, wherein the inner and outer cap assemblies are provided with corresponding seals for closing the open end of the pipe in a substantially sealed manner and protecting the at least one latch from the outside environment.

22. A security cap for removably closing an open pipe end in a substantially sealed manner, the security cap defining an inner receiving space for the open pipe end, the security cap including:
- an inner cap assembly inside which is located the receiving space for the open pipe end;
- an outer cap assembly concentrically mounted over the inner cap assembly and selectively rotatable with respect to the inner cap assembly, the outer cap assembly having an inner portion;
- a holding ring cooperating with the inner and outer cap assemblies;
- a plurality of spaced-apart seals, at least two of the seals directly exposed to the receiving space for the open pipe end; and
- a plurality of latches extending through the inner cap assembly and positioned entirely within the outer cap assembly, the latches being in a driving engagement with the inner portion of the outer cap assembly and having tips selectively movable in and out of the receiving space for the open pipe, the latches being unexposed to the outside environment when the open pipe end is closed by the security cap.

23. The security cap according to claim 22, further including a locking assembly provided between the inner cap assembly and the outer cap assembly, the locking assembly having a locked configuration where a relative rotation between the outer and inner cap assemblies is prevented, and an unlocked configuration where a relative rotation between the outer and inner cap assemblies is permitted.

24. The security cap according to claim 23, further including a handheld actuating assembly, the actuating assembly having a rod cooperating with the locking assembly and passing through the outer cap assembly to set the locking assembly in the unlocked configuration.

25. The security cap according to claim 24, wherein the actuating assembly includes:
- a base removably engageable with an outer top surface of the outer cap assembly; and
- a lever cooperating with the rod.

* * * * *